United States Patent [19]

Watanabe et al.

[11] Patent Number: 4,800,250
[45] Date of Patent: Jan. 24, 1989

[54] METHODS AND APPARATUS FOR MANUFACTURING TUBES

[75] Inventors: Michio Watanabe, Yokohama; Kazuhisa Ishibashi, Tokyo; Kenji Matsuno; Hideo Kurashima, both of Yokohama, all of Japan

[73] Assignee: Toyo Seikan Kaisha, Ltd., Tokyo, Japan

[21] Appl. No.: 64,548

[22] Filed: Jun. 22, 1987

[30] Foreign Application Priority Data

Jun. 23, 1986 [JP] Japan .................. 61-146734

[51] Int. Cl.$^4$ ............................................. B23K 26/00
[52] U.S. Cl. .......................... 219/121.63; 219/121.64; 219/160; 219/121.13; 219/121.14
[58] Field of Search ............... 219/121 LC, 121 LD, 219/121 EC, 121 ED, 121 PJ, 64, 160

[56] References Cited

U.S. PATENT DOCUMENTS 4,354,090 10/1982 Nilsen ........................ 219/121 LC
4,675,496  6/1987 Toyoshima et al. ......... 219/121 LD Primary Examiner—C. L. Albritton
Attorney, Agent, or Firm—Saidman, Sterne, Kessler & Goldstein

[57] ABSTRACT

A method and apparatus for guiding the opposed edges of sheet material into substantially abutting edge-to-edge relationship with one another and thereafter welding said edges by a high energy welding source to form a seam. The invention enables the continuous high speed butt welding of the sheet material to form cylindrical bodies. The apparatus includes three elements, a mandrel, a mandrel holder and tube holders. Sheet material is fed to around said mandrel and advanced by a tube holder with an edge of two opposite edges of said sheet material being in intimate contact with a basis plane of said mandrel holder. Another edges is slided into contact with above mentioned edge of sheet material making abutting relationship after passing through the basis plane of said mandrel holder. These abutting edges pass a high energy zone of a welder and butt welded to make a tube.

5 Claims, 3 Drawing Sheets

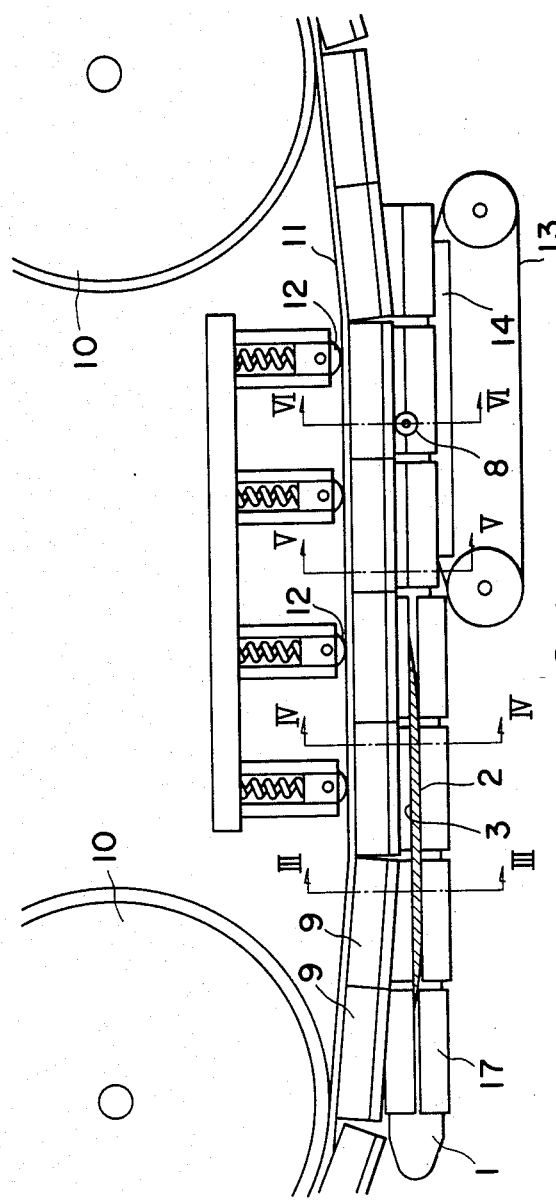
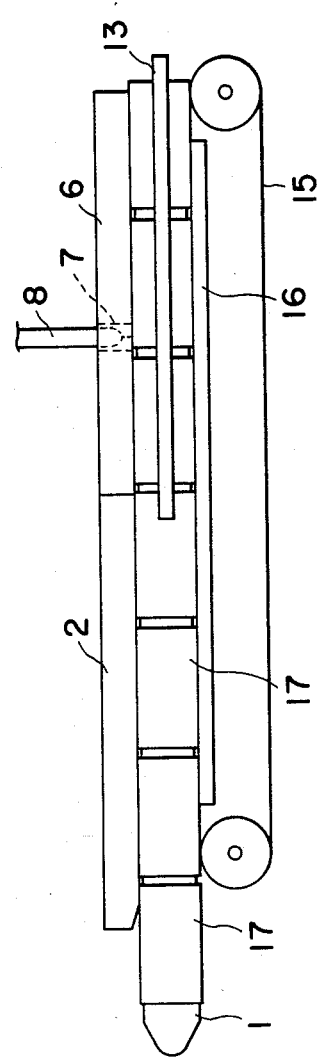

METHODS AND APPARATUS FOR MANUFACTURING TUBES

BACKGROUND OF THE INVENTION

This invention relates to methods and apparatus for manufacturing such tubes as cans for preserved food are made from.

As for methods for manufacturing metal sheet tubes by means of butt welding, in U.S. Pat. No. 4,152,573 a method for manufacturing tubes is disclosed. As disclosed in that patent, two opposite edges of a sheet metal are held by a vise into abutting edge-to-edge engagement and such opposite edges are guided to pass through high energy zone of a laser beam and welded.

In U.S. Pat. No. 4,354,090, other prior art is disclosed.

As disclosed in that patent, two opposite edges of a sheet metal are guided in two guide channels of a Z-bar guide apparatus from radially offset position into intimate abutting edge-to-edge engagement with each other prior to introducing the sheet metal into a high energy welding apparatus such as a laser, electron beam or other welding machine. The method of holding two opposite edges of a sheet metal by a vise is disadvantageous in that circumferential positioning of abutting edges to a narrow energy focusing zone of a laser or the like requires a special device and apparatus for that method are complicated. That method is not fit for mass production because of batch processing.

The method of Z-bar guide apparatus is not fit for producing tubes of a large thickness to diameter ratio because distortion of a sheet metal is three-dimentional. And that process often causes defective welding at an edge of a seam because of bad abutting edge-to-edge relationship.

It is a primary object of this invention to provide a method for producing tubes by which abutting opposite edges of a sheet metal are accurately guided into high energy focusing zone of a welding machine such as a laser welder. It is further object of this invention to provide a method and an apparatus for producing tubes which is fit for mass production. It is another object of this invention to provide a method and an apparatus for producing tubes which is fit for production of tubes of a large thickness to diameter ratio.

SUMMARY OF THE INVENTION

A mandrel of shape of a bar whose exterior dimensions are virtually equal to interior dimensions of tubes manufactured is prepared. A mandrel holder with a basis plane being parallel with an axis of said mandrel and terminated at surface of said mandrel is attached to said mandrel.

Tube holders are pressed against sheet material of cylindrical configurations on said mandrel and said tube holders hold said sheet material with an edge of two opposite edges of said sheet material being in intimate contact with said basis plane of said mandrel holder. Said tube holders are advanced parallel with the axis of said mandrel with said edge of sheet material being slided along said basis plane. Then position of above-mentioned edge of sheet material is unchanged except component of axis of said mandrel even after said sheet material passed through terminal point of said basis plane. Therefore, if another edge of said sheet material which confronts with above-mentioned edge of said sheet material is put into contact with said edge, these abutting edges pass through a predetermined position. Said abutting edges are joined along all the length by focusing high energy of joining apparatus to said predetermined position. Distortion of sheet material which occurs on advancement thereof along an axis of a mandrel is opening or closing of two opposite edges of said sheet material and said distortion is two-dimensional. Therefor tubes of small interior dimensions or a large thickness to diameter ratio are easily manufactured because necessary distortions are two-dimensional not three-dimensional.

BRIEF DESCRIPTION OF THE DRAWINGS

FIG. 1 is a plan view illustrating one application of the invention in which a horizontal plate of a mandrel holder 2 and slide plate 6 are taken away.

FIG. 2 is a side elevational view thereof.

DESCRIPTION OF THE PREFERRED EMBODIMENTS

Figure 3:
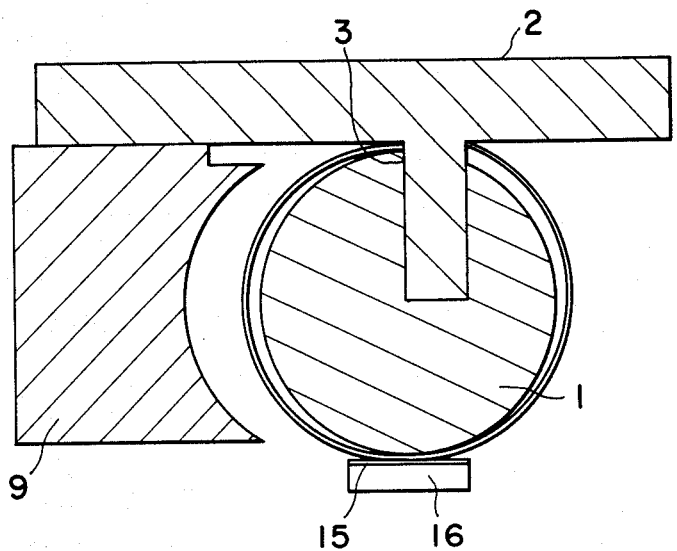
FIG. 3 is an enlarged sectional view taken on the line III—III FIG. 1.
Figure 4:
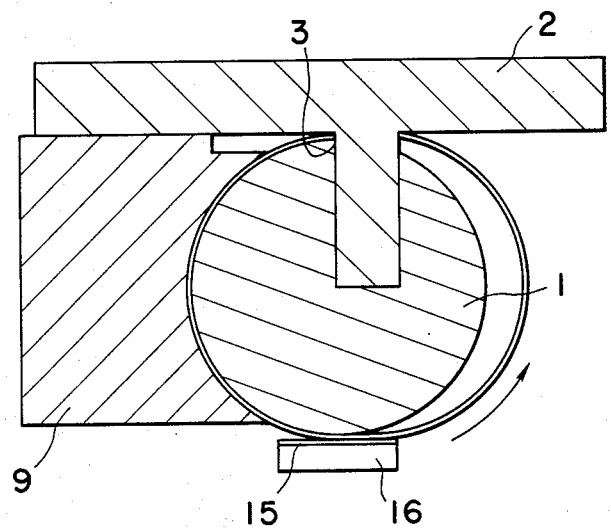
FIG. 4 is an enlarged sectional view taken on the line IV—IV of FIG. 1.
Figure 5:
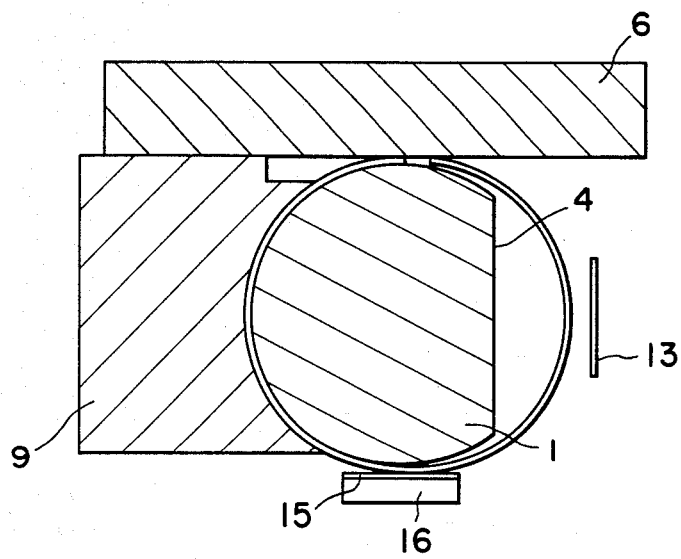
FIG. 5 is an enlarged sectional view taken on the line V—V of FIG. 1.
Figure 6:
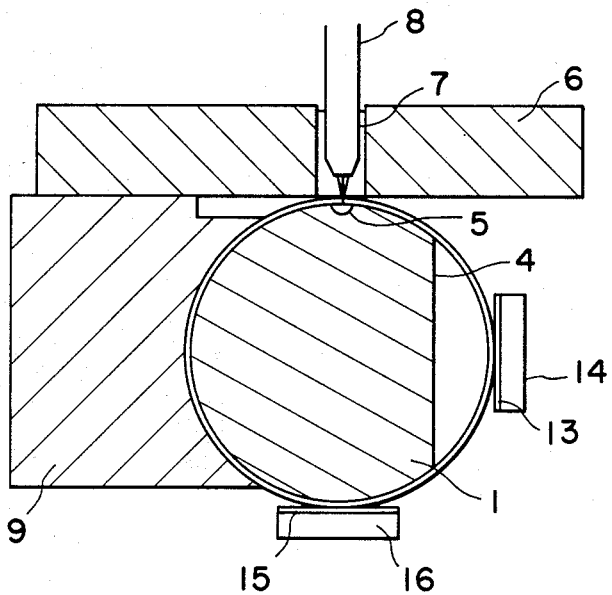
FIG. 6 is an enlarged sectional view taken on the line VI—VI of FIG. 1.

Referring to the accompanying drawings, a mandrel 1 whose exterior diameter is virtually equal to interior diameter of tubes manufactured is connected to a mandrel holder 2 along a portion of its length. The mandrel holder 2 is composed of a horizontal plate and a vertical plate. Said vertical plate of said mandrel holder 2 has a basis plane 3 which is parallel with an axis of said mandrel 1, and positioned collinearly with a radius of the mandrel 1. A plane which is opposite to said basis plane is tapered at both ends so that sheet material 17 can be easily introduced. Said mandrel 1 has an elongated notch 4 at the rearward of a portion which is connected to said mandrel holder 2 and a spot notch 5 in alignment with said basis plane. Above the mandrel 1, a slide plate 6 extends from an end point of the mandrel holder 2 to rearward at a distance of the thickness of said sheet material 17 and confronts the mandrel 1. The slide plate 6 has a hole 7 just above the spot notch 5.

A nozzle of laser beam 8 is inserted into the hole 7 of the slide plate 6. An endless belt 11 is stretched between pulleys 10, 10 and tube holders 9 of magnet are attached to said endless belt 11 along all the length.

The pulleys 10 are driven by a drive mechanism which is not depicted in the drawings and the tube holders 9 are moved from left to right along the axis of mandrel continuously. Idler rollers 12, 12 are pressed against the back of the endless belt 11 resiliently, and thereby faces of tube holders 9 that confront the mandrel 1 are pressed against the mandrel 1 with sheet material 17 between.

An endless belt 15 which is pressed against lower surface of the mandrel 1 by a press board 16 is driven by a mechanism ( not shown in the drawing ) so that upper portion of it moves from left to right. An endless belt 13 is arranged near the elongated notch 4 of the mandrel 1 and driven by a mechanism ( not shown in the drawing ) from left to right on mandrel side under pressure of a press board 14 of an elastic body.

The embodiment of this invention is constructed as mentioned above. The operation of it is described hereinafter. Sheet material of ferromagnetism which is formed into a cylindrical shape is fed to cover the mandrel 1 by mechanism well known in the art. An edge of two opposite edges of said sheet material is pressed against the basis plane 3 of the mandrel holder 2 by elastic force of sheet material itself. In that state, the tube holder 9 is pressed against sheet material 17 which is carried by the endless belt 15, and hereafter while the tube holder 9 moves substantially in concert with the sheet material along the for mandrel 1, no relative displacement between the sheet material 17 and the tube holder 9 occurs because of magnetic attraction.

On the other hand the tube holder 9 is guided by the mandrel 1 and the lower surface of the horizontal plate of the mandrel holder 2 or the lower surface of the slide plate 6, and thereby above-mentioned edge of sheet material does not change its position concerning circumferential direction of the mandrel 1. The other edge of sheet material is moved along slide plate 6 into abutting relationship with the edge which is constant about circumferential position as above mentioned, being pressed by the endless belt 13 in the vicinity of the elongated notch 4. The nozzle of laser beam 8 is arranged exactly onto the abutting edges so that welding is done with exact position adjustment. Because the spot notch 5 arranged to welding position, welding heat will not escape from back of the sheet material.

As described above magnetic force is used for holding of sheet material in that embodiment of this invention. Of course the invention is by no means limited to it, and frictional force may also be used if the frictional coefficient of the surface of the tube holder is greater than that of the surface of the mandrel. Vacuum force may also be used by opening holes on the touching surface of the tube holder and sucking air from these holes by mean of air ducts arranged on the back of the tube holder.

In stead of endless belts 13 and 15, drive rollers which are resiliently mounted one after another may also be used.

Furthermore, plastic sheet material may take the place of metal sheet material of that embodiment of this invention, and it may be butt welded by infrared light beam or supersonic waves.

This invention can be also applied for manufacturing angular tubes using an angular bar in stead of a cylindrical mandrel.

In this invention necessary distortion of sheet material for tubes is two-dimensional, and thereby tubes of small interior dimension can be easily manufactured and defective welding cannot occur because bad abutting relationship cannot be produced even at ends of a seam. And in this invention the position of abutting edges of sheet material is adjusted accurately in both horizontal and vertical directions so that it is fit to use welder which concentrates energy into narrower place such as a laser welder. It enables to manufacture tubes by advancing sheet material at constant speed so that it is fit to mass production of tubes.

What is claimed is:

1. A method of producing tubes, comprising the steps of feeding rectangular sheet material around a cylindrical mandrel; advancing said sheet material along an axis of said mandrel, said sheet material being pressed against said mandrel by a tube holder which moves substantially in concert with said sheet material; letting said tube holder hold said sheet material with a first edge of two opposite edges of the sheet material being in intimate contact with a basis plane of a mandrel holder, said basis plane being parallel to the axis of said mandrel; advancing said tube holder along the axis of said mandrel with said sheet material passed through a terminal point of said basis plane of said mandrel holder; guiding said tube holder with a horizontal plane of said mandrel holder, said plane being operative to prevent said tube holder from moving about the circumference of said mandrel; sliding the second edge of said sheet material along a face of a slide plane until said two opposite edges are in abutting edge-to-edge relationship with one another; passing said abutting edges through a predetermined position of a joining apparatus; and joining said abutting edges.

2. The method of claim 1 in which said joining apparatus is a laser welder and said predetermined position of a joining apparatus is a high energy welding zone.

3. Apparatus for manufacturing tubes from sheet material, comprising: a mandrel of substantially cylindrical shape; a mandrel holder, which supports said mandrel, said mandrel holder having a horizontal plane positioned at a distance corresponding to the approximate thickness of said sheet material, and a basis plane positioned collinearly with a radius of said mandrel; means for feeding rectangular sheet material around said mandrel; means for advancing said sheet material axially along said mandrel; a plurality of tube holders that moves substantially in concert with said sheet material, said plurality of tube holders being operative to hold said sheet material with a first edge of two opposite edges of said sheet material in intimate contact with said basis plane, both of said edges being guided by said horizontal plane, said plane being operative to prevent said tube holder from moving about the circumference of said mandrels; means for pressing said sheet material and sliding the second edge of said sheet material until said two opposite edges are in abutting edge-to-edge relationship with one another; and a welding machine which concentrates high energy to a zone through which said abutting edges pass.

4. The invention of claim 3 in which a welding machine is a laser welder.

5. The invention of claim 3 in which a welding machine is a electron beam welder.

* * * * *